US012664078B2

(12) United States Patent (10) Patent No.: US 12,664,078 B2

Sugarev (45) Date of Patent: Jun. 23, 2026

(54) SOURCE CODE LEVEL CHAOS INJECTION

(71) Applicant: SAP SE, Walldorf (DE)

(72) Inventor: Radoslav Ivanov Sugarev, Petrich (BG)

(73) Assignee: SAP SE, Walldorf (DE)

( * ) Notice: Subject to any disclaimer, the term of this patent is extended or adjusted under 35 U.S.C. 154(b) by 199 days.

(21) Appl. No.: 18/508,571

(22) Filed: Nov. 14, 2023

(65) Prior Publication Data

US 2025/0156307 A1 May 15, 2025

(51) Int. Cl.
G06F 11/3668 (2025.01)

(52) U.S. Cl.
CPC ...... G06F 11/3696 (2013.01); G06F 11/3688 (2013.01)

(58) Field of Classification Search
CPC .................................................. G06F 11/3668
See application file for complete search history.

(56) References Cited

U.S. PATENT DOCUMENTS

| | | | | |
|---|---|---|---|---|
| 11,397,665 B2 * | 7/2022 | Singh | .................. | G06F 11/3698 |
| 2021/0263836 A1 * | 8/2021 | Singh | .................. | G06F 11/3698 |
| 2023/0135825 A1 * | 5/2023 | Surisetty | ............. | G06F 11/3051 |
| | | | | 714/47.2 |
| 2025/0036546 A1 * | 1/2025 | Anderson | ........... | G06F 11/3608 |

FOREIGN PATENT DOCUMENTS

| | | | | |
|---|---|---|---|---|
| CN | 112685290 A | * | 4/2021 | .............. G06F 11/36 |
| CN | 114113984 A | * | 3/2022 | .............. G01R 1/28 |

* cited by examiner

*Primary Examiner* — Jae U Jeon

(74) *Attorney, Agent, or Firm* — Buckley, Maschoff & Talwalkar LLC

(57) ABSTRACT

A system associated with an enterprise computing environment infrastructure may include a chaos testing tool data store that contains a plurality of electronic records, each record including a chaos engineering fault parameter. A computer processor of a chaos testing tool may receive, from a chaos testing user, injection information associated with an element of the enterprise computing environment infrastructure. The chaos testing tool may then access the chaos engineering fault parameter from the chaos testing tool data store and automatically arrange to inject a chaos engineering fault into operation of the element of the enterprise computing environment infrastructure in accordance with the injection information and the chaos fault parameter. A response of the element of the enterprise computing environment infrastructure may then be measured subsequent to said injection, and the system may output an indication of the measured response to the chaos testing user.

17 Claims, 13 Drawing Sheets

1100

| TEST IDENTIFIER 1102 | CHAOS TESTING USER IDENTIFIER 1104 | FAULT PARAMETER 1106 | INJECTION INFORMATION 1108 | STATUS 1110 |
|---|---|---|---|---|
| T_101 | CTU_101 | 50 MSEC DELAY | ON OPERATION | PENDING |
| T_102 | CTU_101 | HIGH CPU | ON CONTEXT | RUNNING |
| T_103 | CTU_102 | USER TRAFFIC SURGE | ON OPERATION | RESULTS MEASURED |
| T_104 | CTU_101 | LOW MEMORY | ON SCENARIO | RESULTS MEASURED |

SOURCE CODE LEVEL CHAOS INJECTION

BACKGROUND

An enterprise may utilize a computing environment infrastructure to let users perform tasks. For example, the enterprise might let various users execute applications or services in the computing environment infrastructure to process purchase orders, adjust human resources information, generate invoices, etc. In some cases, the enterprise may want to test the infrastructure to investigate prior failures (e.g., an outage) and/or to avoid future problems. Testing the infrastructure may involve intentionally introducing faults and observing how the system responds. The field of "chaos engineering" involves testing the resilience and reliability of software systems in production by intentionally introducing faults to determine the system's ability to withstand unexpected disruptions. Chaos engineering experiments may involve things like shutting down system components, introducing delays or errors into the network, overwhelming servers with traffic, or simulating other disruptive events, to observe how the system responds and recovers. The goal is to learn about and improve the system's ability to tolerate such failures (without impacting end users).

Manually introducing such faults can be a time consuming, difficult, and error prone task, especially when there are a large number of faults of various types, a substantial number of applications and services to be investigated, etc. It would therefore be desirable to provide a chaos testing tool for an enterprise computing environment infrastructure in a secure, automatic, and efficient manner.

SUMMARY

According to some embodiments, methods and systems associated with an enterprise computing environment infrastructure may include a chaos testing tool data store that contains a plurality of electronic records, each record including a chaos engineering fault parameter. A computer processor of a chaos testing tool may receive, from a chaos testing user, injection information associated with an element of the enterprise computing environment infrastructure. The chaos testing tool may then access the chaos engineering fault parameter from the chaos testing tool data store and automatically arrange to inject a chaos engineering fault into operation of the element of the enterprise computing environment infrastructure in accordance with the injection information and the chaos fault parameter. A response of the element of the enterprise computing environment infrastructure may then be measured subsequent to said injection, and the system may output an indication of the measured response to the chaos testing user.

Some embodiments comprise: means for receiving, at a computer processor of a chaos testing tool from a chaos testing user, injection information associated with an element of the enterprise computing environment infrastructure; means for accessing a chaos engineering fault parameter from a chaos testing tool data store; means for automatically arranging to inject a chaos engineering fault into operation of the element of the enterprise computing environment infrastructure in accordance with the injection information and the chaos fault parameter; means for measuring a response of the element of the enterprise computing environment infrastructure subsequent to said injection; and means for outputting an indication of the measured response to the chaos testing user.

Some technical advantages of some embodiments disclosed herein are improved systems and methods to provide a chaos testing tool for an enterprise computing environment infrastructure in a secure, automatic, and efficient manner.

BRIEF DESCRIPTION OF THE DRAWINGS

FIG. 11 is portion of a chaos testing tool data store in accordance with some embodiments.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
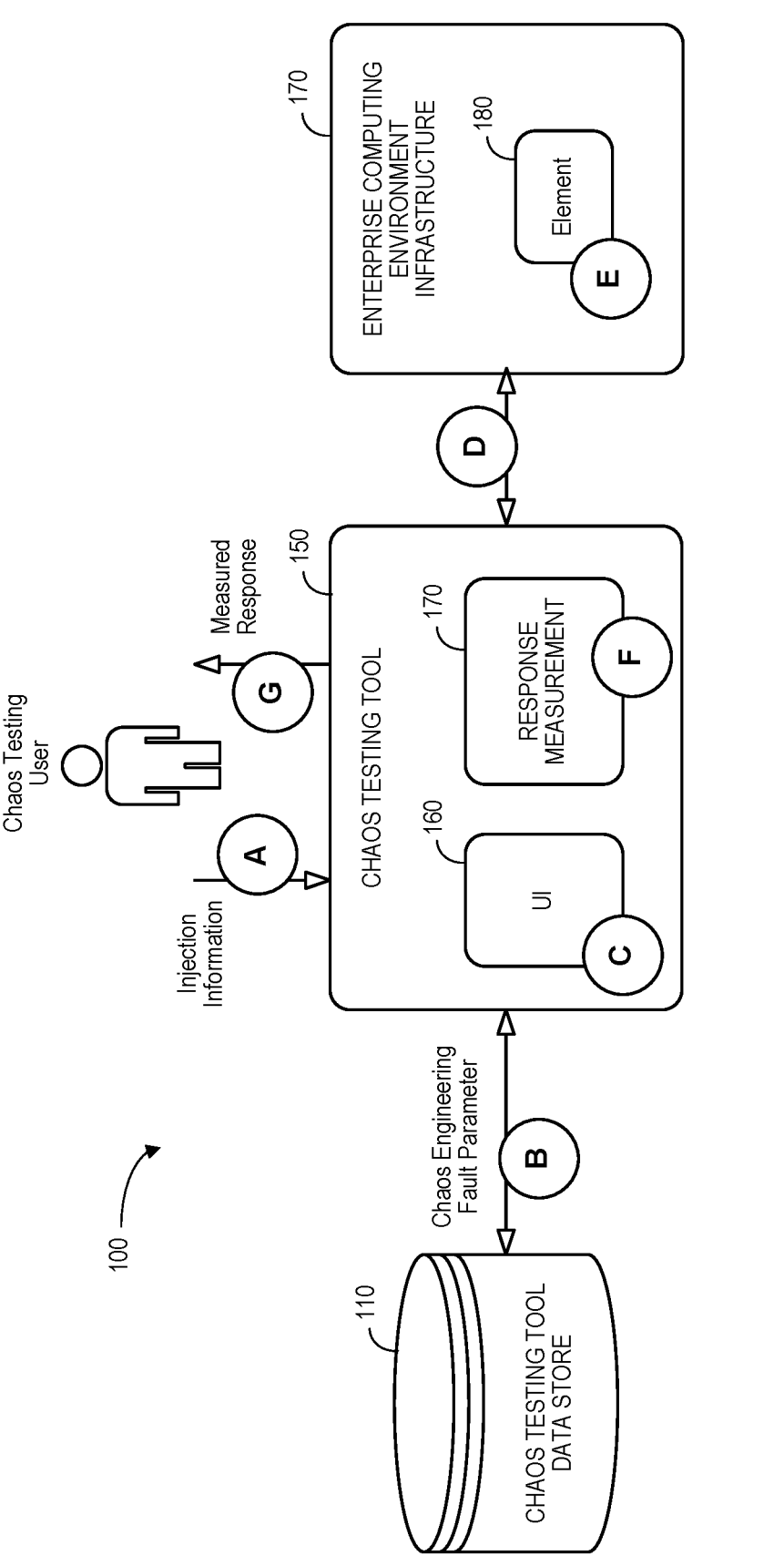
FIG. 1 is a high-level system architecture in accordance with some embodiments.

FIG. 1 is a high-level block diagram of one example of a system 100 that provides source code level chaos injection. In particular, a chaos testing user may provide injection information to a chaos testing tool 150 at (A). The injection information may be provided, for example, at a based-on-application level, a based-on-system level, a based-on-context level, etc. At (B), the chaos testing tool 150 accesses at least one chaos engineering fault parameter (e.g., specifying a particular delay or failure to be introduced) from a chaos testing tool data store 110. The chaos testing tool 150 may then use a User Interface ("UI") 160 at (C) to automatically provide source code level chaos injection. At (D), the chaos testing tool 150 may introduce the fault to an element 180 of an enterprise computing environment infrastructure 170 at (E). The response of the analysis may then be measured 170 at (F) and provided at (G) to the chaos testing user. According to some embodiments, a remote operator or administrator device may be used to configure or otherwise adjust the system 100.

As used herein, devices, including those associated with the system 100 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The chaos testing tool 150 may store information into and/or retrieve information from various data stores (e.g., the chaos testing tool data store), which may be locally stored or reside remote from the chaos testing tool 150. Although a single chaos testing tool 150 is shown in FIG. 1, any number of such devices may be included. Moreover, various devices described herein might be combined according to embodiments of the present invention. For example, in some embodiments, the chaos testing tool data store 110 and the chaos testing tool 150 might comprise a single apparatus. The system 100 functions may be performed by a constellation of networked apparatuses, such as in a distributed processing or cloud-based architecture.

The chaos testing user may access the system 100 via a remote device (e.g., a Personal Computer ("PC"), tablet, or smartphone) to view information about and/or manage operational information in accordance with any of the embodiments described herein. In some cases, an interactive Graphical User Interface ("GUI") display may let an operator or administrator define and/or adjust certain parameters via a remote device (e.g., to specify how the tool 150 connects with the enterprise computing environment infrastructure 170) and/or provide or receive automatically generated recommendations, alerts, or results associated with the system 100.

Figure 2:
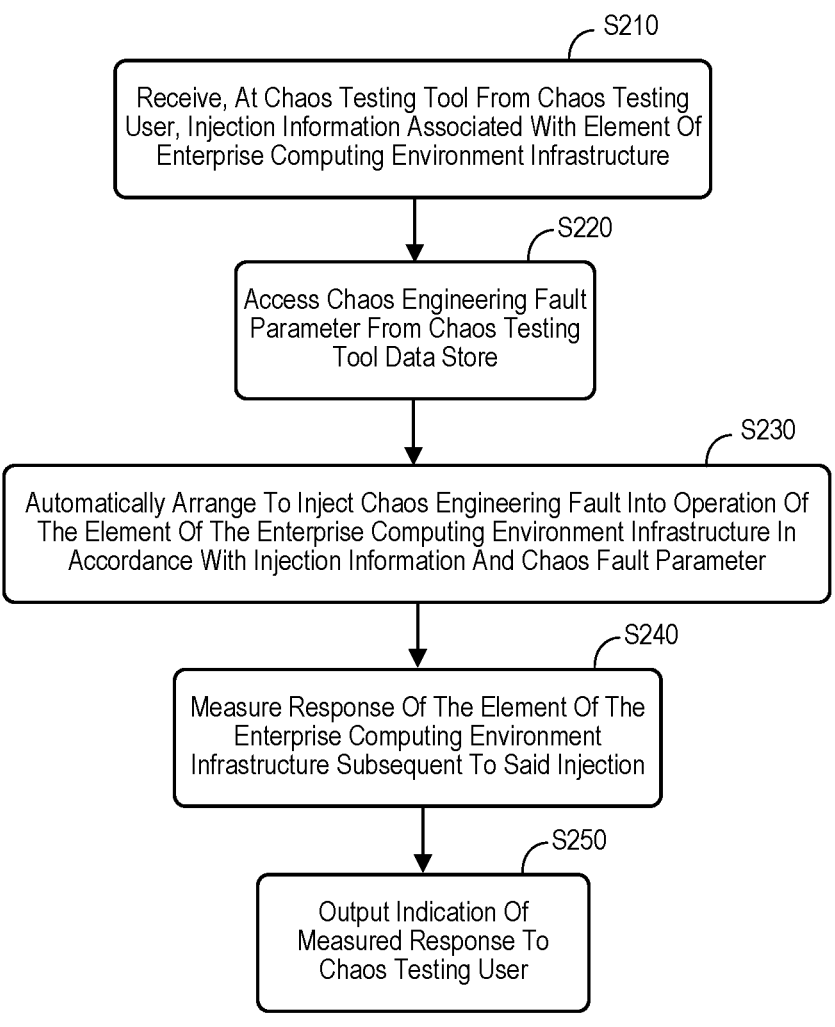
FIG. 2 is a method according to some embodiments.

FIG. 2 is a method that might be performed by some or all of the elements of the system 100 described with respect to FIG. 1. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, a chaos testing tool may receive, from a chaos testing user (e.g., associated with a development team, a quality team, a chaos engineer, etc.), injection information associated with an element of the enterprise computing environment infrastructure. The element of the enterprise computing environment infrastructure might represent, for example, an application, a service, a component, etc.

At S220, the system may access a chaos engineering fault parameter from a chaos testing tool data store. The chaos engineering fault parameter might be associated with, by way of examples only: a failure during communication, a delay in communications between two parties, a blocked execution, a sporadic failure, a delay in execution of an operation, a high level of Central Processing Unit ("CPU") usage, a power outage, a surge in user traffic, a cyber-attack, low memory, code insertion, (or any combination of such faults). According to some embodiments, the chaos engineering fault parameter may be associated with generation of an unexpected output. For example, the fault parameter might simulate a software bug, such as the execution of a different and/or wrong operation that results in an unexpected output. Such an approach might be used, for example, to test if safeguarding and/or validation steps in a business flow properly help ensure that logic is robust, resilient (as it might result in unexpected workflow and hence cause the whole process to stop), and safe enough (that is, it will not have an impact on the enterprise by continuing with a different set of operations than were originally intended).

At S230, the system may automatically arrange to inject a chaos engineering fault into operation of the element of the enterprise computing environment infrastructure in accordance with the injection information and the chaos fault parameter. At S240, a response of the element of the enterprise computing environment infrastructure subsequent to said injection is measured. The system may then output an indication of the measured response to the chaos testing user at S250.

Note that an enterprise cannot completely control or avoid failures in distributed systems. However, the enterprise can control the impact of such failures and optimize recovery time to restore systems. This may be achieved by exercising as many failures as possible during testing to achieve confidence in system resilience. As used herein, the phrase "chaos engineering" may refer to the discipline of experimenting with distributed systems to increase confidence in the system's ability to withstand chaotic conditions through the deliberate injection of faults or failures into the infrastructure in a controlled manner to test the system's ability to respond during a failure. Such an approach may let the engineer practice, prepare, and prevent or minimize downtime and outages before they occur.

Figure 3:
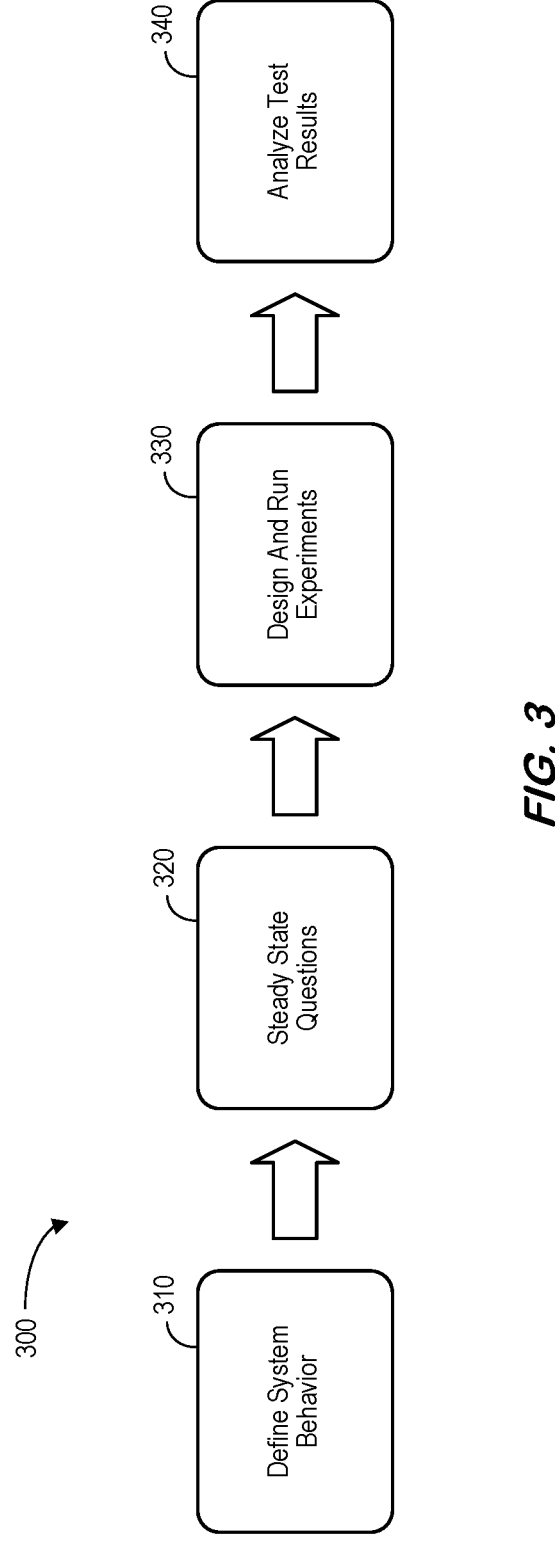
FIG. 3 is a chaos engineering process.

FIG. 3 is a chaos engineering process 300. At 310, the engineer may define the system's normal behavior. The "steady state" might be defined as some measurable output such as overall throughput, error rates, the latency of a system that indicates normal behavior, etc. The system's normal behavior may represent a level acceptable behavior. At 320, the engineer may propose an experiment to the steady state (to hypothesize about the expected output of the experiment) hoping that events injected into the system will not result in a change from the steady state of the target system. As used herein, the term "experiment" may refer to a planned fault injection in a controlled manner. Examples of some fault injections include:

shutting down compute engines randomly in an availability zone (or data center);

an outage of an entire region or availability zone;

resource exhaustion (high CPU, low memory, or heavy disk usage);

a data service failure (e.g., partially deleting a stream of records/messages);

injecting latency between services for a select percentage of traffic over a predetermined period; and code insertion to add instructions to the target program and let the fault injection occur prior to certain instructions.

At 330, the engineer may design experiments to identify possible failure scenarios in the infrastructure and run them in a controlled manner to ensure that there is a recovery plan for every failure experiment. If a recovery plan is unknown, the engineer may identify a path to recovery and record the procedures. At 340, the engineer may analyze test results to Verify if the original hypothesis was correct (or if there was a change to the system's expected steady-state behavior).

Figure 4:
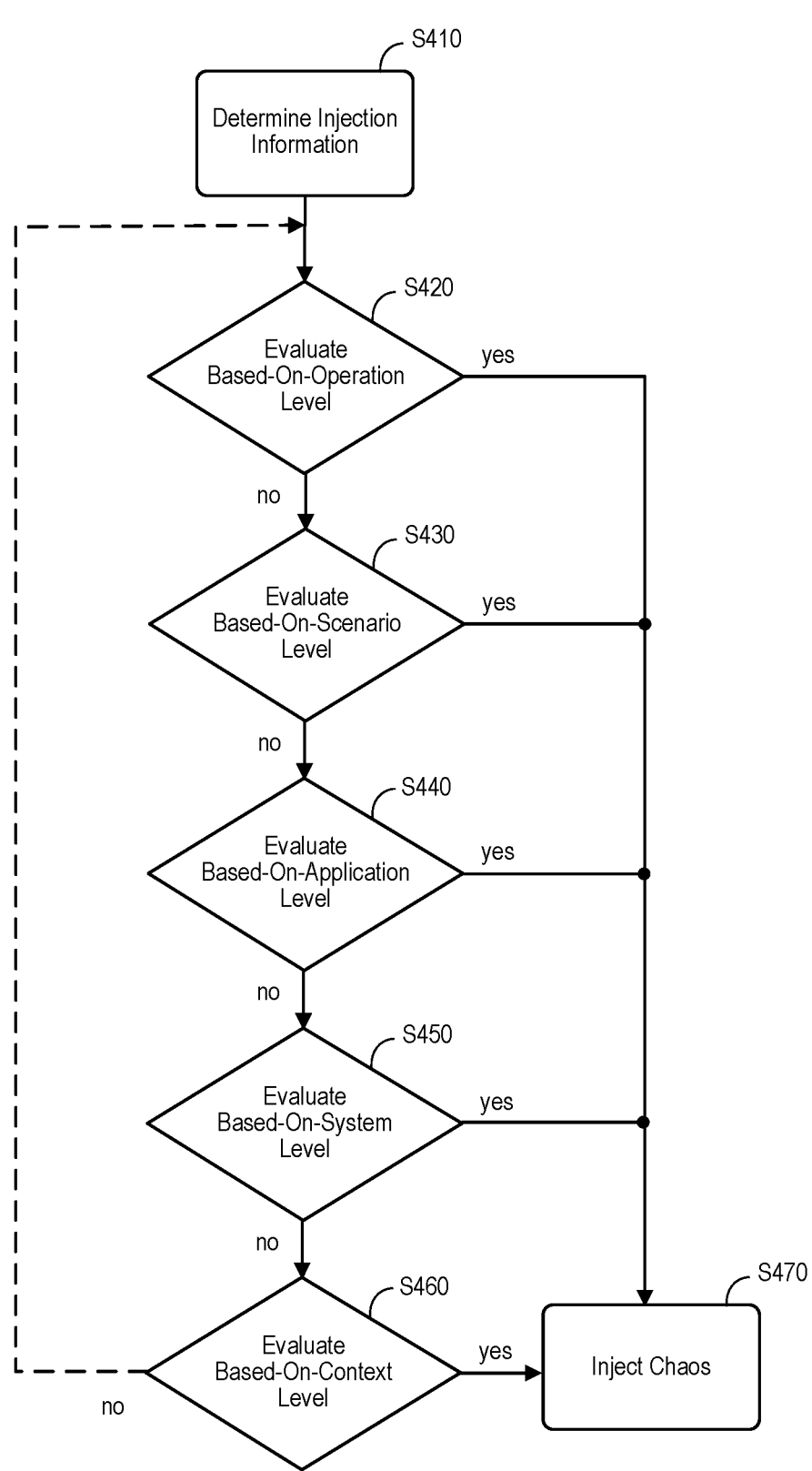
FIG. 4 is a chaos injection evaluation method according to some embodiments.

A user may introduce chaos in a system in many different ways. FIG. 4 is a chaos injection evaluation method according to some embodiments. At S410, the system may determine injection information (e.g., vi a UI). If an evaluation at a based-on-operation level is satisfied at S420 ("yes"), the system may inject the appropriate chaos fault at S470. Otherwise, if an evaluation at a based-on-scenario level is satisfied at S430, the system may inject the appropriate chaos fault at S470. Similarly, if an evaluation at a based-on-application level is satisfied at S440, the system may inject the appropriate chaos fault at S470. If an evaluation at a based-on-system level is satisfied at S450, the system may inject the appropriate chaos fault at S470. Finally, if an evaluation at a based-on-context level is satisfied at S460, the system may inject the appropriate chaos fault at S470. If none of the evaluations are currently satisfied, the evaluations continue at S420 (as illustrated by the dashed arrow in FIG. 4). According to some embodiments, an evaluation may combine requirements at multiple levels (e.g., both scenario and system levels).

Figure 5:
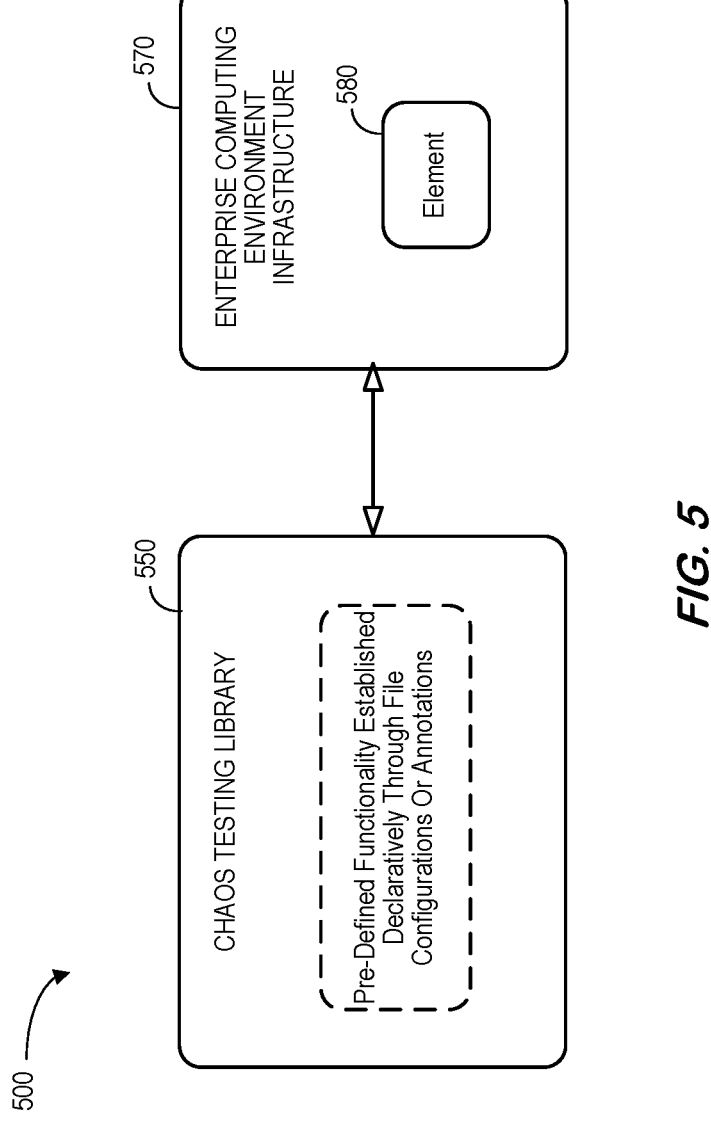
FIG. 5 is a system including a library in accordance with some embodiments.
Figure 6:
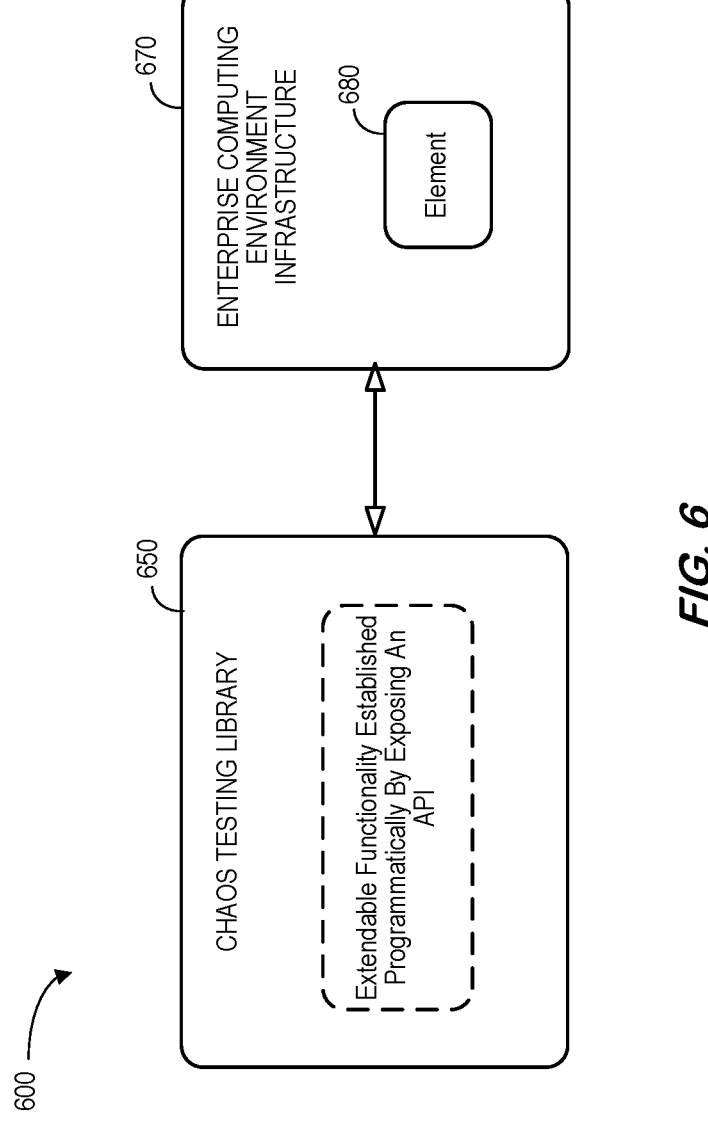
FIG. 6 is another system including a library according to some embodiments.
Figure 7:
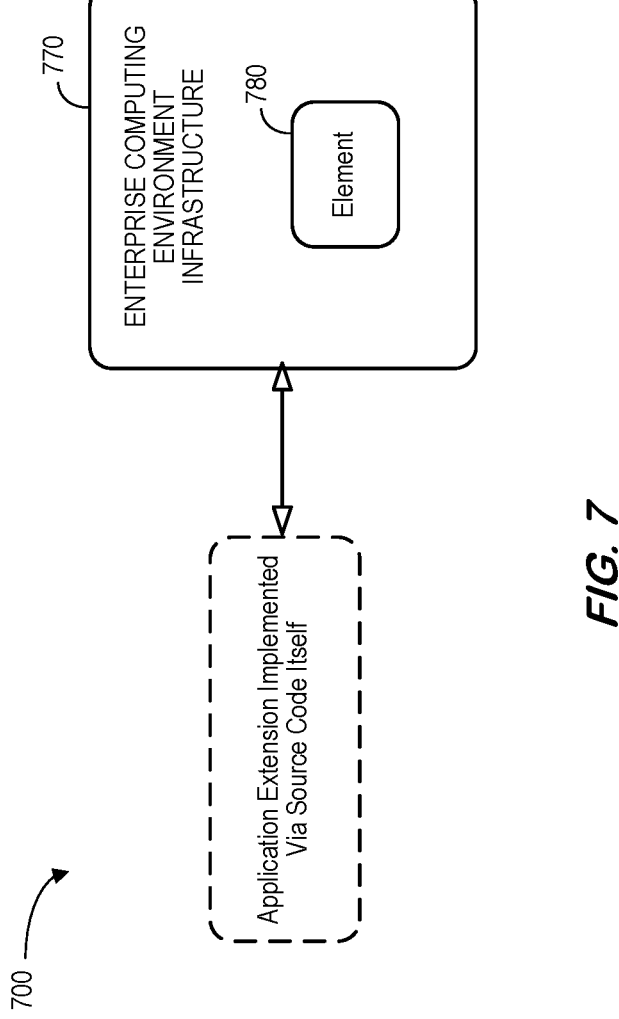
FIG. 7 is a system without a library in accordance with some embodiments.

According to some embodiments, a library may be used to inject faults into a target system. For example, FIG. 5 is a system 500 including a chaos testing library 550 that may be used to inject faults (e.g., a source code level injection) into an element 580 of an enterprise computing environment infrastructure 570. In this case, the library 550 has predefined functionality which is established declaratively through file configurations or annotations. FIG. 6 is another system 600 including a library according to some embodiments. As before, a chaos testing library 650 is used to inject faults into an element 680 of an enterprise computing environment infrastructure 670. In this case, however, the library 650 establishes extendable functionality programmatically by exposing an API. FIG. 7 is a system 700 without a library in accordance with some embodiments. Here, an application extension may be implemented via source code itself to inject faults into an element 780 of an enterprise computing environment infrastructure 770.

Note that source code level chaos injection in the form of a library and/or application extensions may enable fine grained control over the behavior and execution of an operation and the system it is part of. It may give developers the flexibility to add chaos at any place without depending on a particular environment, complex software, or high-cost tools. As a result, developers may build and develop highly resilient and robust software of high value for an enterprise. The functionalities provided by the library or extensions could be either predefined or extendable based on the implementation approach. For example, the library could declare/inject chaos into the system either declaratively (through file configurations or using annotations) or programmatically (by exposing an API that wraps or manipulates the application code in some way).

Some embodiments utilize an extendable library that can declaratively inject chaos with no (or minimal) application source code modifications. Such a library could provide implementation for commonly encountered issues, such as a delay in the communication between two parties, a failure during communication, a sporadic failure or delay in the execution of an operation, high CPU usage, etc. For anything else, the application that integrates the library might be able (in the case, an extendable version of the library is used) to define custom logic that simulates the failure situation. There is no limit to the possible failure scenarios that could be defined. In addition to these characteristics, the library could also be configurable at runtime (i.e., the developer could be able to change the settings with which the library operates). Some of the settings that might determine the way the library works include: a delay time in the communication with a dependent component, a percent of execution failures, enabling or disabling the chaos injection either on an operation, scenario, or application level, etc.

An example implementation for the Java stack could be defined as a library that is built and exposed through an APACHE™ MAVEN® repository that any application could use. Some functionalities of the library might be implemented using Aspect-Oriented Programming ("AOP") with the help of Java annotations. In this way, the library could inject its code during compile time or runtime without structural modification of the application code (i.e., by just declaring the respective injection points with annotation). The implementation might define more than one annotation, and thus lower the implementation effort and make the usage more straightforward. In addition, each annotation might have multiple attributes that define the scope and the context of the chaos operation. For example, chaos might be injected and activated only in certain scenarios or if certain conditions are met (e.g., at a specific time, after a specific number of requests (when the library is used in an HTTP based application) have been processed, etc.). Having a notion of context, the same execution point (in this context this might be a Java method) might be activated at a certain time while being deactivated at other times. All of this could be controlled through the use of a registered Java Management Extension ("JMX") bean that controls the execution settings and thus manipulates when (and how) the library behaves in certain conditions. A set of settings that might be exposed through the JMX might include, for example, a percentage of failures, a delay in the execution, whether the chaos injection is enabled for an execution context or not, etc. The extension points might be defined by declaring an extension interface that should be implemented by the application integrating the library.

Figure 8:
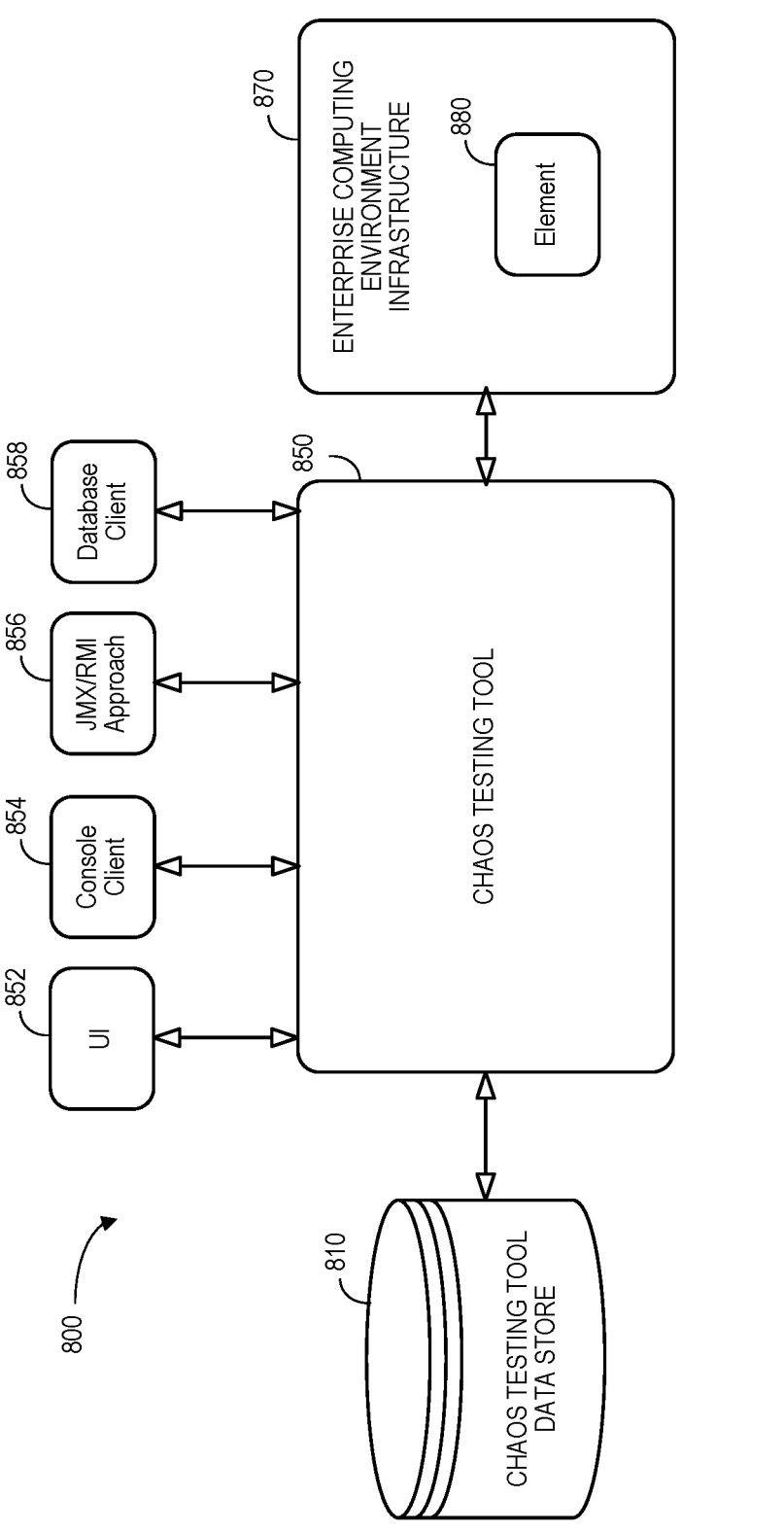
FIG. 8 illustrates various ways a chaos testing user might interact with the system according to some embodiments.

Note that there are many possible ways through which the settings of a library could be manipulated. FIG. 8 illustrates 800 various ways a chaos testing user might interact with the system according to some embodiments. As before, a chaos testing tool 850 may receive injection information and access at least one chaos engineering fault parameter (e.g., specifying a particular delay or failure to be introduced) from a chaos testing tool data store 810. The chaos testing tool 850 may then automatically provide source code level chaos injection introducing the fault to an element 880 of an enterprise computing environment infrastructure 870. In this example, the chaos testing tool receives information from a UI 852, a console client 854, a JMX or Remote Method Invocation ("RMI") approach 856, a database client 858, etc.

In this way, embodiments may let development and/or quality teams add randomized and/or controlled chaos in the form of failures, delays, blocked execution, etc. in the execution flow of applications, services, and components. As a result, a user can evaluate the resilience measures that have been taken for application stability. In addition, the user can simulate an environment of failures (e.g., to reproduce a situation that caused an outage and find a solution to prevent it from happing again). Embodiments may provide a good fit for single scenario evaluation and/or testing as well for the overall stability and responsiveness of an application. Embodiments may be useful for, by way of example:

evaluating an idea or technique that to increase the stability of a software component;

building a resilience and/or stability pipeline for regression in developed measures;

reproducing an outage by building a similar failure environment;

emulating a failure during the communication with a dependent component (such as a network failure, a delay in the response, a failure to connect, a response with failure, etc.).

Note that any of these functionalities could be developed as part of an application itself and not as part of a separate library. Moreover, some implementations of a library might provide an option to spy, stub, or mock an operation result and thus change further execution behavior, if applicable, as might be the case in systems where the result is an object onto which further operations are performed. Embodiments could have a scope and context that limits chaos injection only for the defined scope and context (this way, fine grained control over the behavior of the library is guaranteed). Moreover, implementers could use AOP or any other tool, technique, or means for the implementation.

Figure 9:
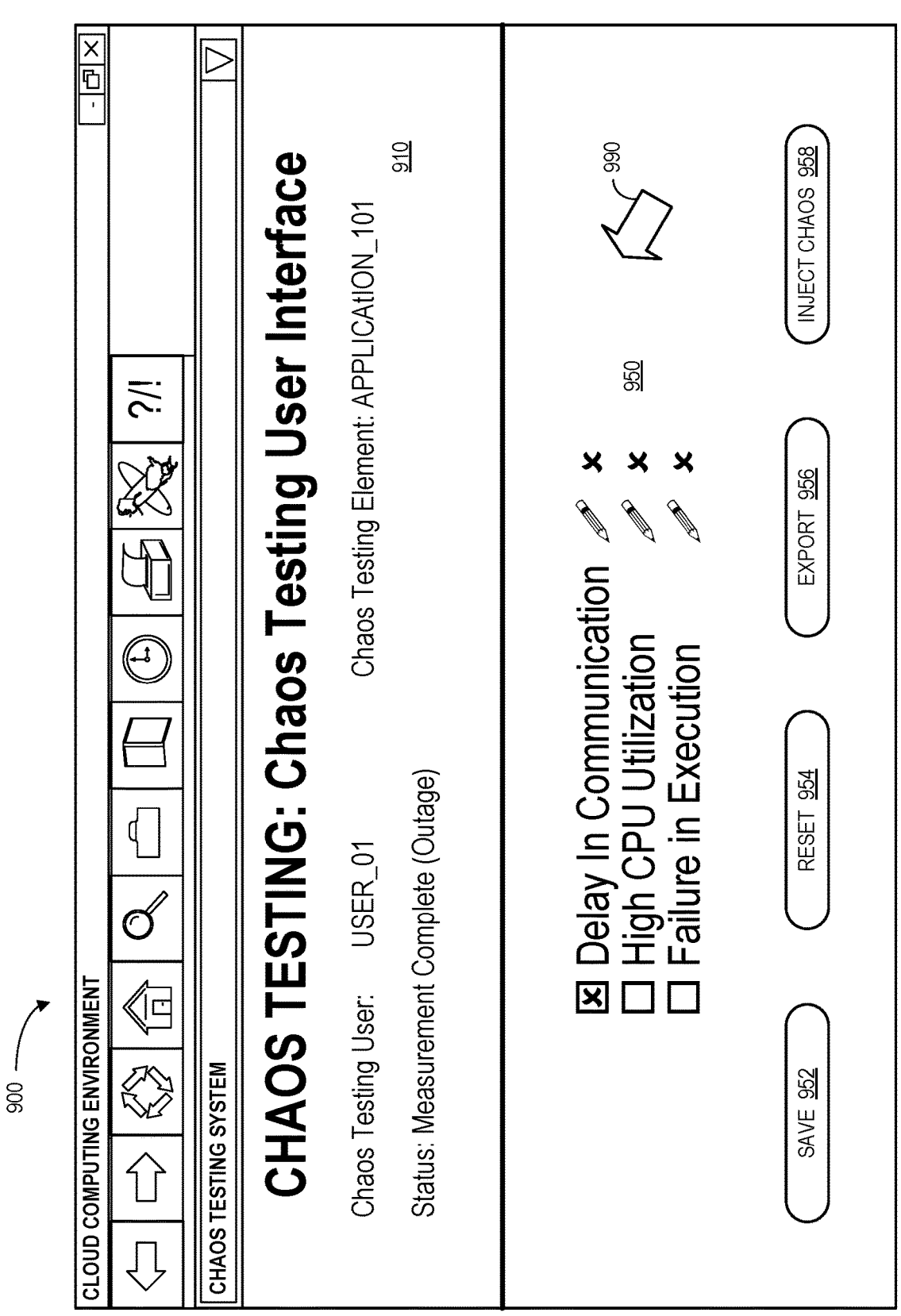
FIG. 9 is a chaos testing user interface display in accordance with some embodiments.

Note that a UI 852 may be used to provide chaos testing information to a chaos testing tool. FIG. 9 is a chaos testing user interface display 900 in accordance with some embodiments. The display 900 includes general information 910 such as a user identifier, a testing element, a test status, etc. The display 900 also includes a list 950 of chaos testing types. Selection of an item in the list 950 (e.g., via touchscreen or computer mouse pointer 990) might let the user add details about that item (e.g., injection information, an item fault parameter, etc.). The user may also select a "Save" icon 952, a "Reset" icon 954, an "Export" icon 956 (e.g., to save information for a spreadsheet application), and an "Inject Chaos" icon 958 (e.g., to initiate a test).

Thus, embodiments may address the limited functionalities provided by general-purpose tools, the cost of conducting such types of testing, the limitations in the environment in which the tools can run, the limited control a team has over an overall setup, the limited influence a development team may have over tool direction and development, etc. Embodiments may let developers define any desired metrics and behavior, tailor a test for specific application needs. Such a chaos tool may be executed in a local environment without any additional cost (at any time).

Figure 10:
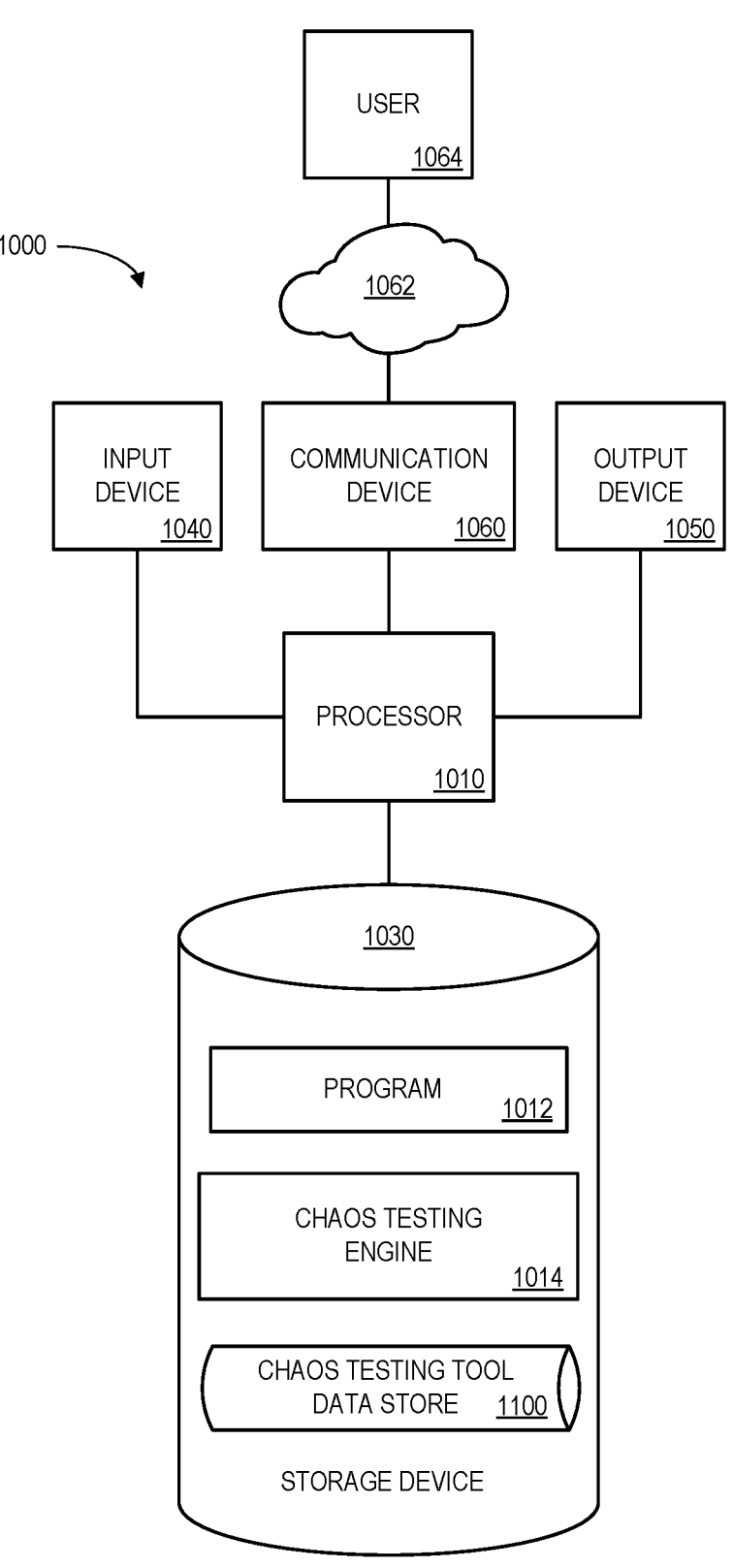
FIG. 10 is an apparatus or platform according to some embodiments.

Note that the embodiments described herein may be implemented using any number of different hardware configurations. For example, FIG. 10 is a block diagram of an apparatus or platform 1000 that may be, for example, associated with the system 100 of FIG. 1 (and/or any other system described herein). The platform 1000 comprises a processor 1010, such as one or more commercially available Central Processing Units ("CPUs") in the form of one-chip microprocessors, coupled to a communication device 1060 configured to communicate via a communication network 1062. The communication device 1060 may be used to communicate, for example, with one or more remote users 1064, administrator platforms, etc. The platform 1000 further includes an input device 1040 (e.g., a computer mouse and/or keyboard to input injection and fault information) and/an output device 1050 (e.g., a computer monitor to render a display, transmit recommendations and alerts, and/or create reports about test results, etc.).

The processor 1010 also communicates with a storage device 1030. The storage device 1030 may comprise any appropriate information storage device, including combinations of magnetic storage devices (e.g., a hard disk drive), optical storage devices, mobile telephones, and/or semiconductor memory devices. The storage device 1030 stores a program 1012 and/or chaos testing engine 1014 for controlling the processor 1010. The processor 1010 performs instructions of the programs 1012, 1014, and thereby operates in accordance with any of the embodiments described herein. For example, the processor 1010 may receive, from a chaos testing user 1064, injection information associated with an element of the enterprise computing environment infrastructure. The processor 1010 may then access a chaos engineering fault parameter and automatically arrange to inject a chaos engineering fault into operation of the element of the enterprise computing environment infrastructure in accordance with the injection information and the chaos fault parameter. A response of the element of the enterprise computing environment infrastructure may then be measured by processor 1010 subsequent to said injection, and the processor 1010 may output an indication of the measured response to the chaos testing user 1064.

The programs 1012, 1014 may be stored in a compressed, uncompiled and/or encrypted format. The programs 1012, 1014 may furthermore include other program elements, such as an operating system, clipboard application, a database management system, and/or device drivers used by the processor 1010 to interface with peripheral devices.

As used herein, information may be "received" by or "transmitted" to, for example: (i) the platform 1000 from another device; or (ii) a software application or module within the platform 1000 from another software application, module, or any other source.

In some embodiments (such as the one shown in FIG. 10), the storage device 1030 further stores a chaos testing tool data store 1100. An example of a database that may be used in connection with the platform 1000 will now be described in detail with respect to FIG. 11. Note that the database described herein is only one example, and additional and/or different information may be stored therein. Moreover, various databases might be split or combined in accordance with any of the embodiments described herein.

Referring to FIG. 11, a table is shown that represents the chaos testing tool data store 1100 that may be stored at the platform 1000 according to some embodiments. The table may include, for example, entries identifying chaos test defined and/or executed by a user associated with an enterprise computing environment infrastructure. The table may also define fields 1102, 1104, 1106, 1108, 1110 for each of the entries. The fields 1102, 1104, 1106, 1108, 1110 may, according to some embodiments, specify: a test identifier 1102, a chaos testing user identifier 1104, fault parameter 1106, injection information 1108, and a status 1110. The chaos testing tool data store 1100 may be created and updated, for example, when a new test is defined, a test is adjusted or executed, etc.

The test identifier 1102 might be a unique alphanumeric label that is associated with a particular chaos engineering test that has been defined by a user associated with the chaos testing user identifier 1104. The fault parameter 1106 might define how the fault operates and the injection information 1108 may define when the fault should be introduced to the element being tested. The status 1110 might indicate that a test is pending, results that have been measured by the system, etc.

In this way, embodiments may let developers easily declare points in a system that are subject to failure and test how the system behaves when a real failure occurs. Users can set up, configure, and test systems in any preferred environment (from local to production). With other approaches, developers have little or no control over the setup and behavior of the environment in which the tests are conducted, require a high degree of control over the infrastructure and a substantial cost for having all in place. The developer's inability to easily set up and test how the system behaves can result in many tests being skipped, which can lead to system downtime and lost revenue due to missed orders or penalties.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 12:
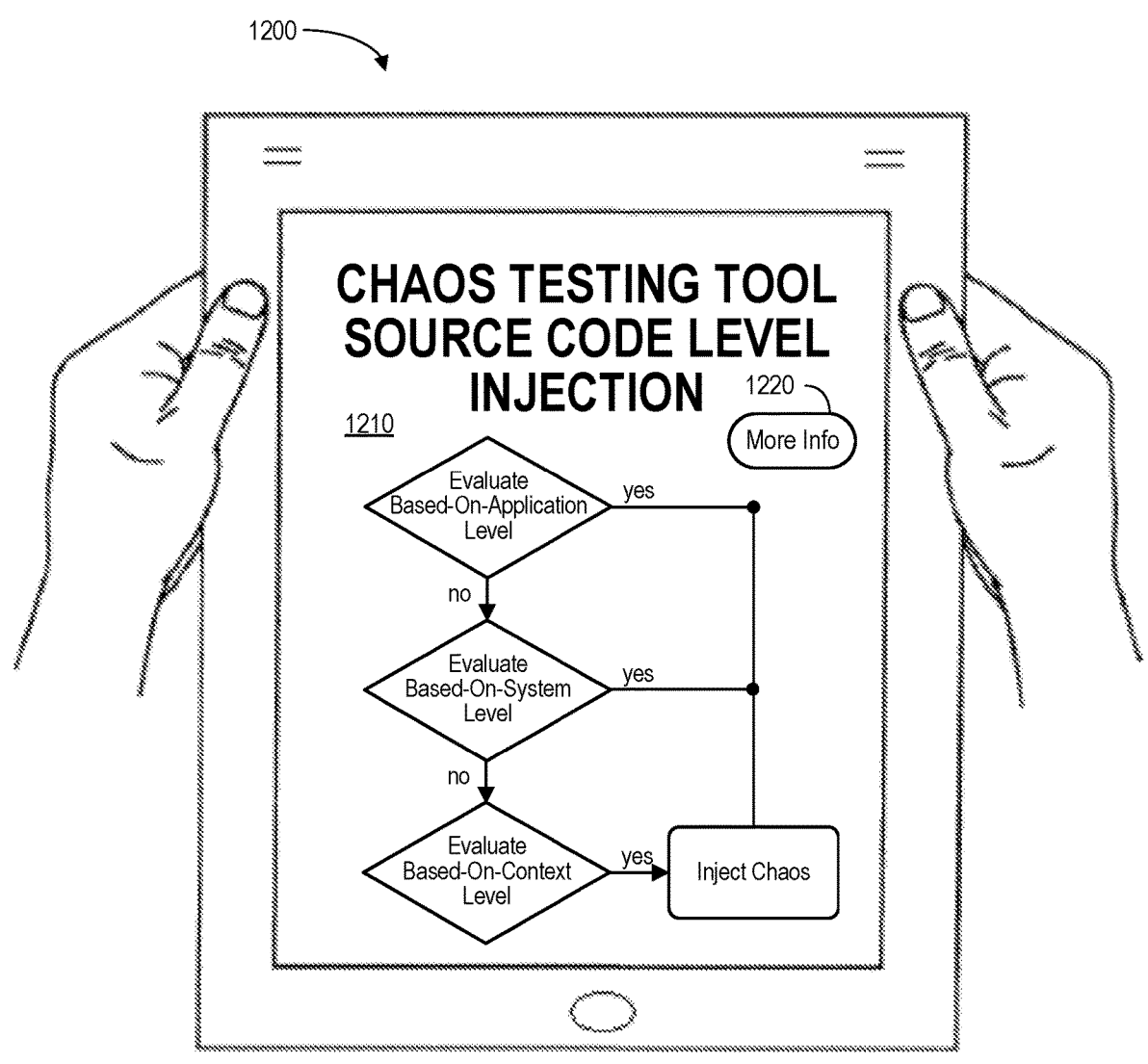
FIG. 12 illustrates a tablet computer according to some embodiments.

Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular types of faults and applications, any of the embodiments described herein could be applied to other types of faults and applications. Moreover, the displays shown herein are provided only as examples, and any other type of user interface could be implemented. For example, FIG. 12 illustrates a tablet computer 1200 providing injection information evaluations for chaos testing tool 1210. The evaluations might be used, for example, to view and/or modify aspects of the chaos injection via selection of a "More Info" icon 1220.

Figure 13:
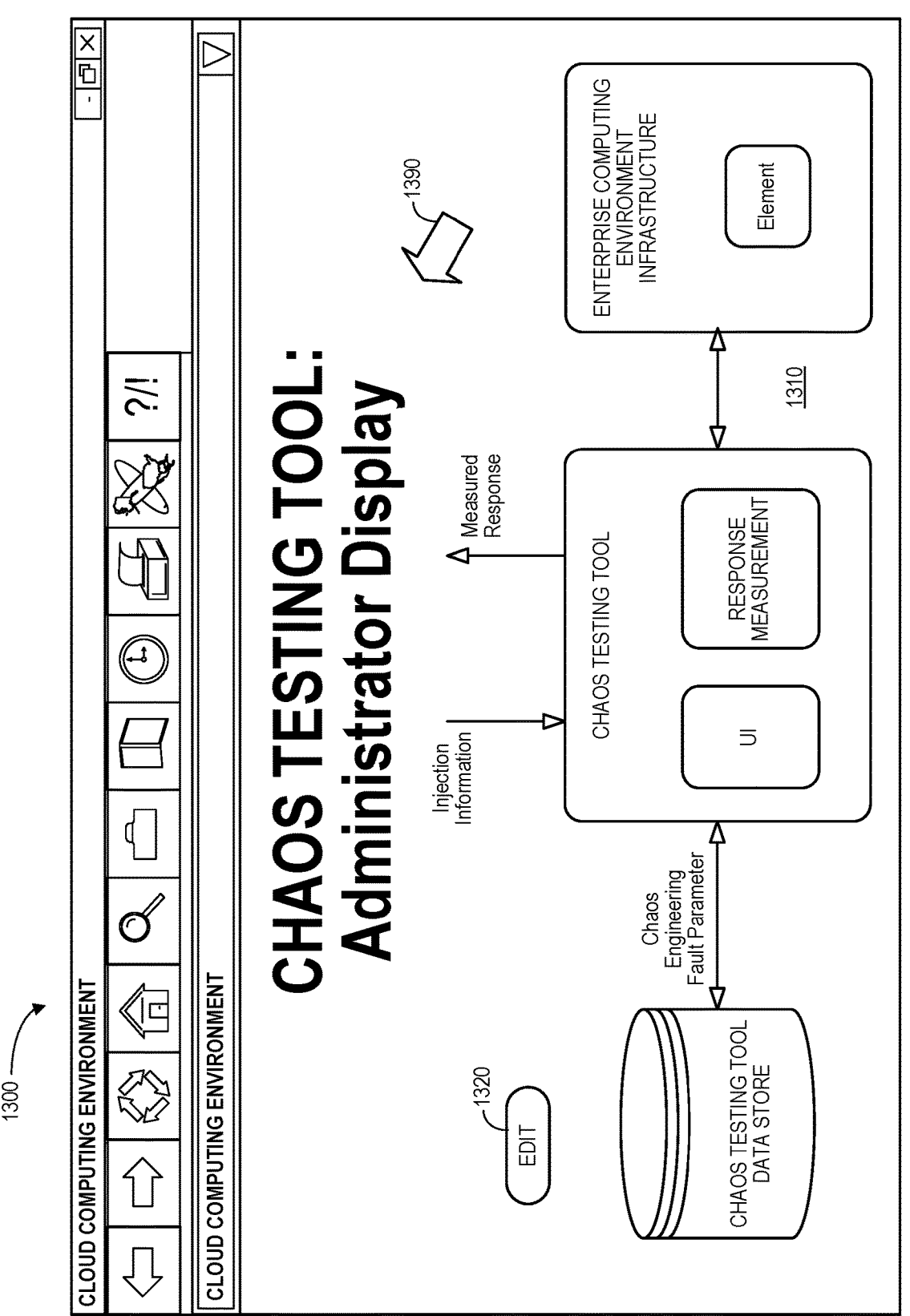
FIG. 13 is an operator or administrator display in accordance with some embodiments.

FIG. 13 is an operator or administrator display in accordance with some embodiments. The display 1300 includes a graphical representation 1310 of a chaos testing tool system in accordance with any of the embodiments described herein. Selection of an element on the display 1300 (e.g., via a touchscreen or computer pointer 1390) may result in display of a pop-up window containing more detailed information about that element and/or various options (e.g., to define how a chaos testing tool interacts with an enterprise computing environment infrastructure, etc.). Selection of an "Edit" icon 1320 may also let an operator or administrator adjust the operation of the system (e.g., to change mapping to a data store, adjust a list of approved users, etc.).

The present invention has been described in terms of several embodiments solely for the purpose of illustration. Persons skilled in the art will recognize from this description that the invention is not limited to the embodiments described but may be practiced with modifications and alterations limited only by the spirit and scope of the appended claims.

The invention claimed is:

1. A system associated with an enterprise computing environment infrastructure, comprising:

a chaos testing tool data store that contains a chaos engineering fault parameter, the chaos testing tool data store being associated with a library; and a chaos testing tool, coupled to the chaos testing tool data store, including:

a computer processor, and a computer memory storing instructions that when executed by the computer processor cause the chaos testing tool to:

receive, from a chaos testing user via a user interface of the chaos testing tool, injection information associated with an element of the enterprise computing environment infrastructure;

access the chaos engineering fault parameter from the chaos testing tool data store;

automatically inject, via the library, a chaos engineering fault into a production operation of the element of the enterprise computing environment infrastructure in accordance with the injection information and the chaos fault parameter, the library, being configurable at a runtime, programmatically injects the chaos engineering fault into the production operation of the element by exposing an Application Programming Interface ("API") that manipulates application code;

measure a response of the enterprise computing environment infrastructure subsequent to the injection of the chaos engineering fault into the operation of the element of the enterprise computing environment infrastructure; and output, to a user interface (UI) of a device of the chaos testing user, an indication of the measured response of the enterprise computing environment infrastructure to the injection of the chaos engineering fault and at least one of an alert and a recommendation associated with the production operation of the enterprise computing environment infrastructure, each being automatically generated in response to the measured response of the enterprise computing environment infrastructure to the injection of the chaos engineering fault.

2. The system of claim 1, wherein the element of the enterprise computing environment infrastructure is associated with at least one of: (i) an application, (ii) a service, and (iii) a component.

3. The system of claim 1, wherein the chaos engineering fault parameter is associated with at least one of: (i) a failure during communication, (ii) a delay in communications between two parties, (iii) a blocked execution, (iv) a sporadic failure, (v) a delay in execution of an operation, (vi) a high level of Central Processing Unit ("CPU") usage, (vii) a power outage, (viii) a surge in user traffic, (ix) a cyberattack, (x) low memory, (xi) code insertion, and (xii) generation of an unexpected output.

4. The system of claim 1, wherein the injection information is associated with at least one of: (i) a based-on-operation level, (ii) a based-on-scenario level, (iii) a based-on-application level, (iv) a based-on-system level, and (v) a based-on-context level.

5. The system of claim 1, wherein the injection information is received via at least one of: (i) a user interface, (ii) a console client, (iii) a Java Management Extension ("JMX"), (iv) a Remote Method Invocation ("RMI"), and (v) a database client.

6. The system of claim 1, wherein the chaos testing user is associated with at least one of: (i) a development team, (ii) a quality team, and (iii) a chaos engineer.

7. The system of claim 1, wherein the library is associated with at least one of: (i) pre-defined functionality, and (ii) extensible functionality.

8. The system of claim 1, wherein the library is used to declaratively perform said injection through at least one of: (i) file configurations, and (ii) annotations.

9. The system of claim 1, wherein said injection comprises a source code level injection.

10. A computer-implemented method associated with an enterprise computing environment infrastructure, comprising:

receiving, at a computer processor of a chaos testing tool from a chaos testing user via a user interface of the chaos testing tool, injection information associated with an element of the enterprise computing environment infrastructure;

accessing a chaos engineering fault parameter from a chaos testing tool data store, the chaos testing tool data store being associated with a library;

automatically inject, via the library, a chaos engineering fault into a production operation of the element of the enterprise computing environment infrastructure in accordance with the injection information and the chaos fault parameter, the library, being configurable at a runtime, programmatically injects the chaos engineering fault into the production operation of the element by exposing an Application Programming Interface ("API") that manipulates application code;

measuring a response of the enterprise computing environment infrastructure subsequent to injection of the chaos engineering fault into the operation of the element of the enterprise computing environment infrastructure; and outputting, to a user interface (UI) of a device of the chaos testing user, an indication of the measured response of the enterprise computing environment infrastructure to the injection of the chaos engineering fault and at least one of an alert and a recommendation associated with the production operation of the enterprise computing environment infrastructure, each being automatically generated in response to the measured response of the enterprise computing environment infrastructure to the injection of the chaos engineering fault.

11. The method of claim 10, wherein the element of the enterprise computing environment infrastructure is associated with at least one of: (i) an application, (ii) a service, and (iii) a component.

12. The method of claim 10, wherein the chaos engineering fault parameter is associated with at least one of: (i) a failure during communication, (ii) a delay in communications between two parties, (iii) a blocked execution, (iv) a sporadic failure, (v) a delay in execution of an operation, (vi) a high level of Central Processing Unit ("CPU") usage, (vii) a power outage, (viii) a surge in user traffic, (ix) a cyber-attack, (x) low memory, (xi) code insertion, and (xii) generation of an unexpected output.

13. The method of claim 10, wherein the injection information is associated with at least one of: (i) a based-onoperation level, (ii) a based-on-scenario level, (iii) a based-on-application level, (iv) a based-on-system level, and (v) a based-on-context level.

14. The method of claim 10, wherein the injection information is received via at least one of: (i) a user interface, (ii) a console client, (iii) a Java Management Extension ("JMX"), (iv) a Remote Method Invocation ("RMI"), and (v) a database client.

15. A non-transitory, machine-readable medium comprising instructions thereon that, when executed by a processor, cause the processor to execute operations to perform a method associated with an enterprise computing environment infrastructure, the method comprising:

receiving, at a computer processor of a chaos testing tool from a chaos testing user via a user interface of the chaos testing tool, injection information associated with an element of the enterprise computing environment infrastructure;

accessing a chaos engineering fault parameter from a chaos testing tool data store, the chaos testing tool data store being associated with a library;

automatically inject, via the library, a chaos engineering fault into a production operation of the element of the enterprise computing environment infrastructure in accordance with the injection information and the chaos fault parameter, the library, being configurable at a runtime, programmatically injects the chaos engineering fault into the production operation of the element by exposing an Application Programming Interface ("API") that manipulates application code;

measuring a response of the enterprise computing environment infrastructure subsequent to the injection of the chaos engineering fault into the operation of the element of the enterprise computing environment infrastructure; and outputting, to a user interface (UI) of a device of the chaos testing user, an indication of the measured response of the enterprise computing environment infrastructure to the injection of the chaos engineering fault to the chaos testing user and at least one of an alert and a recommendation associated with the production operation of the enterprise computing environment infrastructure, each being automatically generated in response to the measured response of the enterprise computing environment infrastructure to the injection of the chaos engineering fault.

16. The medium of claim 15, wherein the chaos testing tool data store comprises a library associated with at least one of: (i) pre-defined functionality, and (ii) extensible functionality.

17. The medium of claim 16, wherein the library is used to declaratively perform said injection through at least one of: (i) file configurations, and (ii) annotations.

\* \* \* \* \*